US008074866B2

(12) United States Patent
Bird (10) Patent No.: US 8,074,866 B2
(45) Date of Patent: Dec. 13, 2011

(54) METHOD OR RESTORING TURBINE VANE ATTACHMENT SYSTEMS IN A TURBINE ENGINE

(75) Inventor: Derek Bird, Murrysville, PA (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 13/085,815

(22) Filed: Apr. 13, 2011

(65) Prior Publication Data

US 2011/0185570 A1  Aug. 4, 2011

Related U.S. Application Data

(62) Division of application No. 11/243,148, filed on Oct. 4, 2005, now abandoned.

(51) Int. Cl.
*B23K 31/00* (2006.01)
*B23K 31/02* (2006.01)
*B21D 39/00* (2006.01)
*B23P 6/00* (2006.01)

(52) U.S. Cl. ........ 228/119; 228/160; 228/170; 29/889.1

(58) Field of Classification Search .................. 228/119; 29/889.1
See application file for complete search history.

(56) References Cited

U.S. PATENT DOCUMENTS

| | | | | | |
|---|---|---|---|---|---|
| 3,515,844 | A | * | 6/1970 | James et al. | 219/124.22 |
| 3,532,807 | A | * | 10/1970 | Wall, Jr. et al. | 348/90 |
| 3,551,636 | A | * | 12/1970 | Nelson | 219/124.33 |
| 3,555,239 | A | * | 1/1971 | Kerth | 219/124.34 |
| 3,604,612 | A | * | 9/1971 | Miller et al. | 228/45 |
| 3,756,670 | A | * | 9/1973 | Harris | 384/57 |
| 3,781,509 | A | * | 12/1973 | Krakow | 219/125.1 |
| 3,817,440 | A | * | 6/1974 | Bartley | 228/29 |
| 3,848,863 | A | * | 11/1974 | Owen | 269/9 |
| 3,908,683 | A | * | 9/1975 | Demetrick | 137/15.1 |
| 4,108,566 | A | * | 8/1978 | Jones | 408/115 R |
| 4,285,108 | A | * | 8/1981 | Arrigoni | 29/889.1 |
| 4,480,170 | A | * | 10/1984 | Kondou et al. | 219/125.1 |
| 4,559,858 | A | * | 12/1985 | Laskowski et al. | 83/801 |
| 4,599,018 | A | * | 7/1986 | Woods | 408/1 R |
| 4,716,010 | A | * | 12/1987 | Gallo et al. | 376/260 |
| 4,729,716 | A | * | 3/1988 | Schmidt | 416/10 |
| 4,841,123 | A | * | 6/1989 | Novak et al. | 219/125.12 |
| 5,044,075 | A | * | 9/1991 | Brennan et al. | 29/890.031 |
| 5,070,792 | A | * | 12/1991 | Harris | 105/29.1 |
| 5,227,601 | A | * | 7/1993 | Black | 219/61 |

(Continued)

FOREIGN PATENT DOCUMENTS

JP    02205430 A  *  8/1990

*Primary Examiner* — Kiley Stoner
*Assistant Examiner* — Carlos Gamino (57) ABSTRACT

A system and method for repairing turbine vane attachment systems in a turbine engine. In at least one embodiment, the invention may be directed to a system and method for repairing wear on a diaphragm hook fit configured to attach diaphragm airfoils, such as stationary turbine vanes, to a combustion turbine case. The restoration system may be formed from a carriage assembly having an assortment of material processing implements usable to build up material in the worn locations of the turbine vane attachment system to reestablish a diaphragm hook fit within the specified tolerances. The restoration system may be configured so that the restoration process may occur without removing a rotor assembly, which can reduce the repair time by about two weeks. Thus, use of the restoration system can result in a significant time and cost savings.

20 Claims, 8 Drawing Sheets

U.S. PATENT DOCUMENTS

| | | | |
|---|---|---|---|
| 5,403,133 A * | 4/1995 | Kim | 409/178 |
| 5,443,199 A * | 8/1995 | Krumszyn et al. | 228/29 |
| 5,601,403 A * | 2/1997 | Galbraith et al. | 415/173.6 |
| 5,735,214 A * | 4/1998 | Tsuboi | 105/29.1 |
| 5,853,655 A * | 12/1998 | Baker | 266/44 |
| 5,932,123 A * | 8/1999 | Marhofer et al. | 219/130.01 |
| 5,944,248 A * | 8/1999 | Van Heuveln | 228/45 |
| 5,980,204 A * | 11/1999 | Chevrette | 415/174.5 |
| 6,115,917 A * | 9/2000 | Nolan et al. | 29/889.1 |
| 6,158,666 A * | 12/2000 | Banks et al. | 238/10 R |
| 6,189,211 B1 * | 2/2001 | Suter | 29/889.1 |
| 6,382,889 B1 * | 5/2002 | Brown et al. | 409/175 |
| 6,494,307 B1 * | 12/2002 | Kozak et al. | 198/465.1 |
| 6,617,548 B1 * | 9/2003 | Bosio | 219/125.12 |
| 6,800,829 B1 * | 10/2004 | Nimmons | 219/69.17 |
| 7,185,407 B2 * | 3/2007 | Boyl-Davis et al. | 29/33 R |
| 7,836,594 B2 * | 11/2010 | Rose | 29/889.1 |
| 2007/0036618 A1 * | 2/2007 | Fritsche et al. | 408/56 |
| 2010/0162544 A1 * | 7/2010 | Sassatelli et al. | 29/23.51 |

* cited by examiner

METHOD OR RESTORING TURBINE VANE ATTACHMENT SYSTEMS IN A TURBINE ENGINE

CROSS-REFERENCE TO RELATED APPLICATION

This application is a divisional of prior U.S. patent application Ser. No. 11/243,148, filed Oct. 4, 2005 now abandoned, the entirety of which is incorporated by reference herein.

FIELD OF THE INVENTION

This invention is directed generally to turbine engines, and more particularly to turbine vane attachment systems in turbine engines.

BACKGROUND

Typically, gas turbine engines include a compressor for compressing air, a combustor for mixing the compressed air with fuel and igniting the mixture, and a turbine blade assembly for producing power. The turbine blade assembly typically includes a rotor assembly rotatable positioned in a turbine combustion case and having a plurality of turbine blades extending radially outward from the rotor assembly. The turbine engine also includes a plurality of stationary turbine vanes, which are also referred to as diaphragm airfoils, extending radially inward from the turbine combustor case. The turbine blades and turbine vanes are aligned into rows, or stages, and are positioned in alternating rows of vanes and blades. The turbine vanes are typically attached to a turbine combustion case via a hook fit, as shown in cross-section in FIG. 1. The hook fit releasably and securely attaches the turbine vanes within a turbine engine. During operation, the hooks fits are susceptible to wear due to vibration, heat, and other factors. For instance, a hook fit is typically worn in the areas shown in FIG. 1. Such wear negatively affects the safety and efficiency of a turbine engine in which the wear occurs.

Typically, such wear regions are repaired on turbine engines during outages in which other aspects of the turbine engine are repaired. The hook fits of a turbine engine are repaired by first removing the cover half of a turbine of the combustion turbine case to provide access to the internal aspects of the turbine engine. Once the cover half has been removed exposing the rotor assembly, the rotor assembly may be removed from the turbine engine. Removing the rotor assembly from the turbine engine typically takes about two weeks of time and costs about $500,000 per turbine engine. Once the rotor assembly is removed, the cover half is reassembled and the hook fits are repaired using a boring bar.

Conventionally, hooks fits of a turbine engine have been restored manually. For instance, personnel typically use handheld grinders to prepare the worn regions before material is welded to the regions. Once the worn region is prepared, personnel weld material to the worn regions and then manually work the added material into shape using manually controlled grinders. Thus, the quality and precision of the restoration process is limited by the skill, experience, and ability of the personnel operating the grinding equipment. Because the majority of the process is manually controlled, the restoration process lacks the necessary precision to restore the hook fits to their original shape consistently and in a cost efficient and time efficient manner. Thus, a need exists for a more precise, time efficient method of repairing a hook fit of a turbine engine.

SUMMARY OF THE INVENTION

This invention is directed to a system and method for repairing turbine vane attachment systems in a turbine engine. In at least one embodiment, the invention may be directed to a system and method for repairing wear on diaphragm hook fits configured to attach diaphragm airfoils, which are also referred to as stationary turbine vanes, to a combustion turbine case. The restoration system may be formed from a carriage assembly having an assortment of material processing implements usable to build up material in the worn locations of the turbine vane attachment system in a manner to reestablish a diaphragm hook fit within the specified tolerances. The restoration system may be configured so that the carriage assembly can be positioned within a turbine engine without removing a rotor assembly, thereby resulting in significant time and cost savings. In large scale applications of power generation turbine engines, use of the restoration system can reduce the restoration process by about two weeks.

The restoration system may include a movable carriage assembly formed from a housing configured to support a plurality of material processing implements usable to restore worn regions of a diaphragm hook fit. The material processing implements may include, but are not limited to, a milling cutter, such as a dovetail cutter, a welding head, and other appropriate devices. The carriage assembly may include a transport system for moving the carriage assembly in a turbine engine automatically without requiring service personnel to physically move the carriage assembly. In at least one embodiment, the transport system may be formed from a plurality of wheels configured to be attached to a generally curved track. The generally curved track may be configured to support the carriage assembly and to enable the carriage assembly to be movably attached to the combustion turbine case. The track may be configured to be removably attached to the combustion turbine case during the restoration process.

The carriage assembly may also include a component drive system configured to drive the material processing implements. The material processing implements may include, but are not limited to, a milling cutter, a weld head, and other appropriate devices. The component drive system may also include a spindle in communication with a spindle drive device for, driving the material processing implements. The spindle may be configured to receive the material processing implements.

The restoration system may be used to repair a turbine vane attachment system, such as a diaphragm hook fit. In at least one embodiment, the restoration system may be used to restore wear regions in conventional diaphragm hook fits that, without restoration, negatively effect performance of the turbine engine. Access to a diaphragm hook fit may first occur by removing a cover half of the combustion turbine case. Once the cover half has been removed, the turbine vanes may be removed using conventional procedures. Removal of the turbine vanes and turbine blades provides sufficient room for the restoration system to be installed in the turbine engine without having to remove the rotor assembly and incur costs of about $500,000. Thus, use of the restoration system to repair a worn region of a turbine vane attachment system results in a tremendous cost and time savings.

A first generally curved track may be attached to the combustion turbine case proximate to a diaphragm hook fit corresponding to a second row of turbine vanes. A carriage assembly may be movably coupled to the track so that the carriage assembly may travel along the length of the track. Movement of the carriage assembly may be controlled by personnel or by a program on a microcontroller or other appropriate device. The carriage assembly may be placed adjacent to a worn region. A milling cutter may be extended to contact an adjacent worn region, if necessary, to prepare the worn region for repair. The amount of material to be removed may be determined using conventional procedures. A welding head may then be placed in close proximity with the worn region to add material to the worn region to restore the worn region within the specified tolerances of the diaphragm hook fit. The welding head may be passed over a worn region a sufficient number of times to build up the material to a predetermined amount within the specified tolerances of the diaphragm hook fit. The carriage assembly may be moved along the track to facilitate building up material along a length of a worn region. Use of the carriage assembly to add material along the length of a worn region results in a tremendous time savings compared with conventional, manual repair methods.

After material has been added to the worn regions, the carriage assembly may be moved along the track adjacent to the worn region to which material has been added. A milling cutter may be placed into contact with the material added to the worn region to remove excess material that was added. The milling cutter may be rotated with the spindle and spindle drive device. Once the material added to the worn regions has been shaped to fit within the specified dimensional tolerances for the diaphragm hook fit, the material removal procedure may be ceased. The carriage assembly may then be used to work on worn regions on another adjacent diaphragm hook fit using the same process. The process may be preformed on adjacent diaphragm hook fits by attaching a corresponding curved track to the combustion turbine case proximate to another diaphragm hook fit.

An advantage of this invention is that the restoration system and method may be used restore worn regions of a turbine vane attachment system without requiring removal of a rotor assembly. Leaving the rotor assembly in place during the restoration process eliminates about two weeks of work typically required to remove a rotor assembly, thereby saving approximately $500,000 in repair costs per turbine engine.

Another advantage of this invention is that the restoration system reduces the time necessary to restore a worn region. Many worn regions on turbine vane attachment systems extend along a length of the turbine vane attachment system. The restoration system enables material processing implements to be mechanically controlled and precisely positioned to restore the worn regions in less time than conventional restoration procedures conducted manually.

Yet another advantage of this invention is that the restoration system enables diaphragm hook fits to be restored more precisely than is capable with conventional, manual restoration procedures.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

As shown in FIGS. 2-8, this invention is directed to a system and method for repairing wear on a turbine vane attachment system 10. In at least one embodiment, the invention may be directed to a system and method for repairing wear on a diaphragm hook fit 12 configured to attach diaphragm airfoils 14, which are also referred to as stationary turbine vanes, to a combustion turbine case 16. The restoration system 18 may be formed from a carriage assembly 20 having an assortment of material processing implements 26 usable to build up material in the worn locations of the turbine vane attachment system 10 to return the carriage assembly 20 to its original condition. The restoration system 18 may be configured so that the carriage assembly 20 may be positioned within a combustion turbine case 16 without requiring removal of a rotor assembly 21. Eliminating the need to remove the rotor assembly 21 can reduce the time necessary to repair a turbine vane attachment system by about two weeks. Thus, use of the restoration system 18 can result in a significant time and cost savings.

The carriage assembly 20 of the restoration system 18 may be formed from a housing 24 configured to support an assortment of material processing implements 26 usable to repair the turbine vane attachment system 10. In at least one embodiment, the housing 24 of the carriage assembly 20 and the components attached thereto may be sized such that the carriage assembly 20 may be positioned between a rotor assembly 21 and the combustion turbine case 16 to enable a turbine vane attachment system 10 to be repaired without requiring removal of the rotor assembly 21. In at least one embodiment, the height of the carriage may be, but is not limited to being, about twelve inches.

Figure 5:
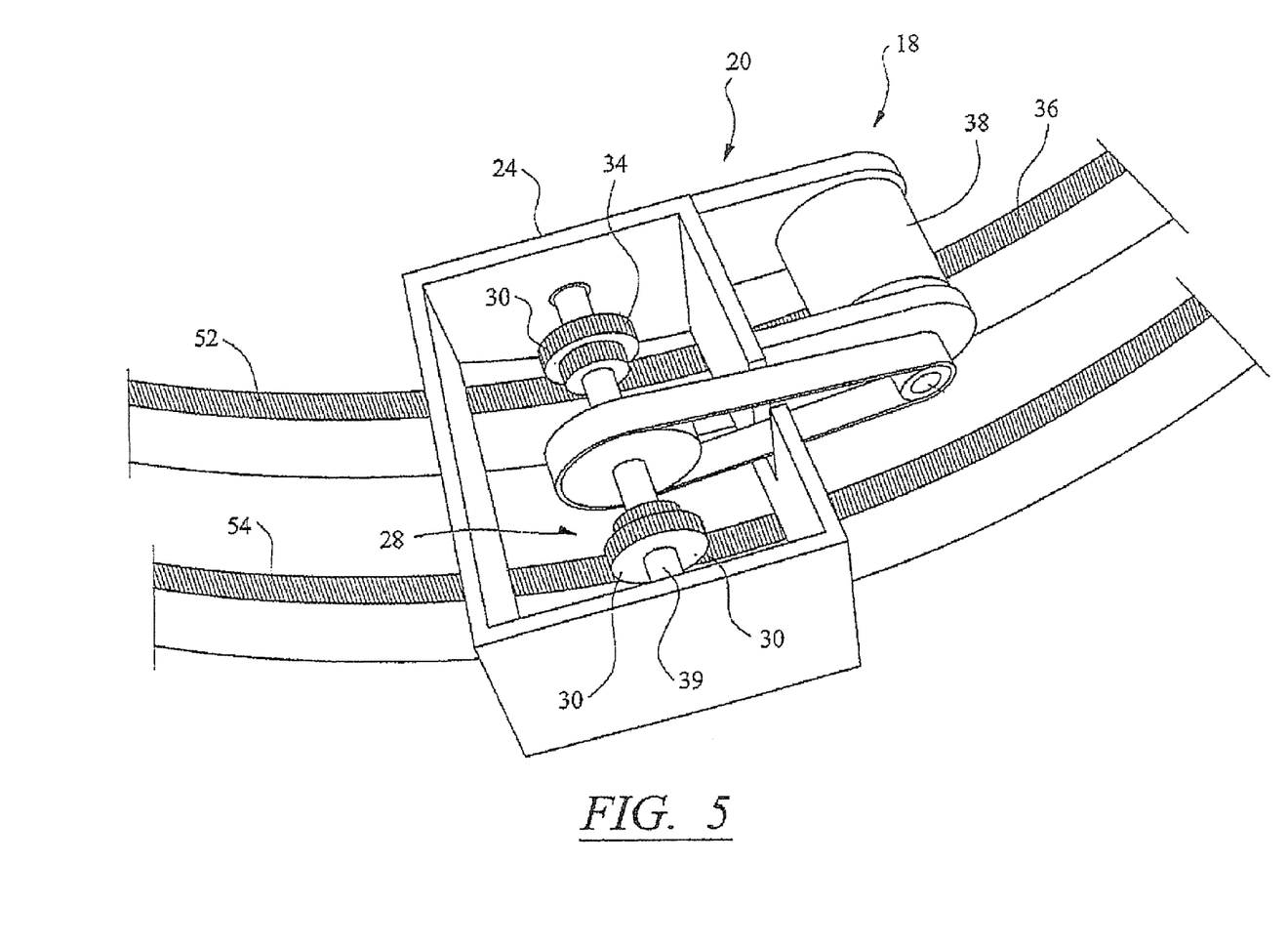
FIG. 5 is detailed perspective view of the carriage assembly.
Figure 6:
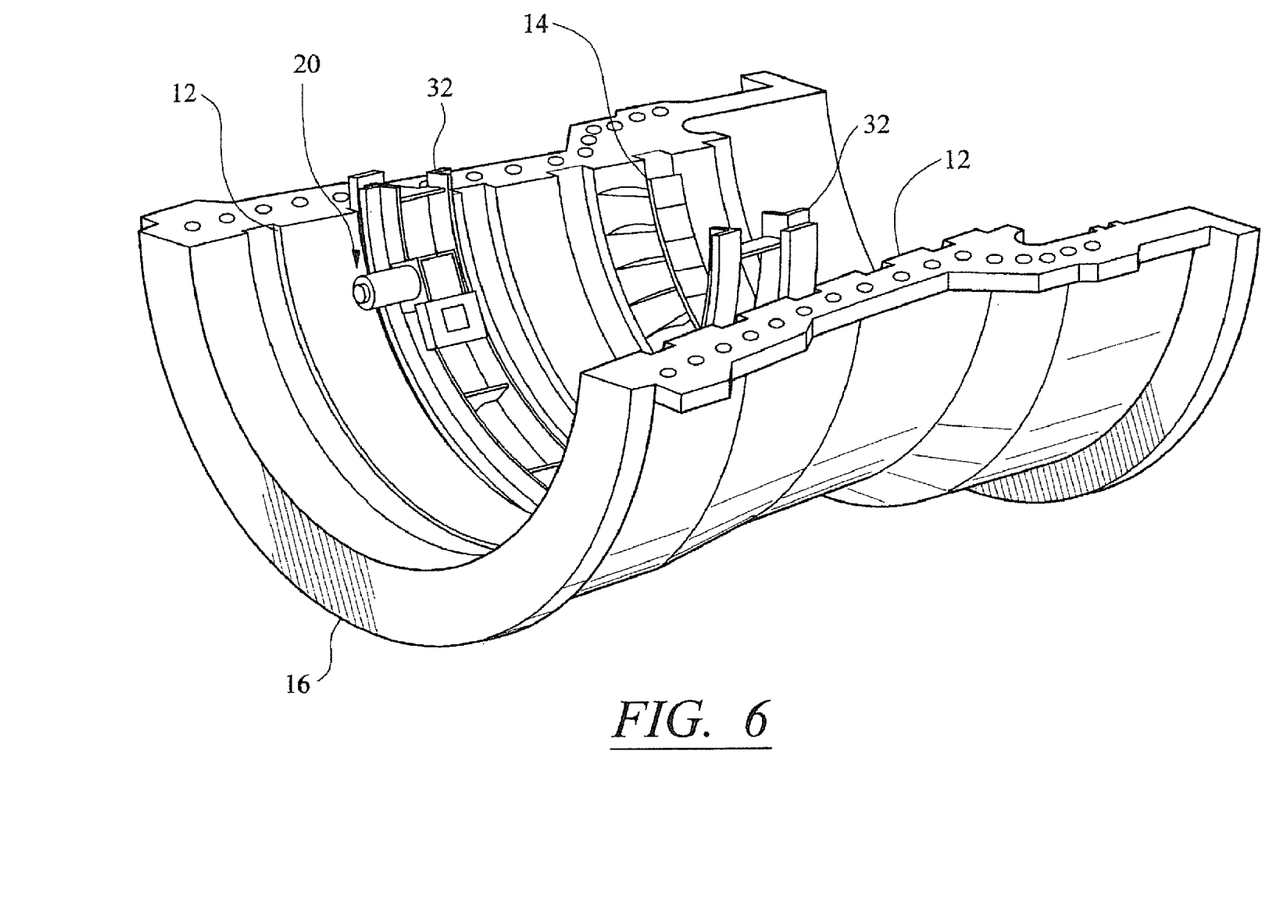
FIG. 6 is perspective view of the restoration system positioned in combustion turbine case with the rotor assembly not shown.

The carriage assembly 20 may include a transport system 28 for moving the carriage assembly 20 in a turbine engine automatically without requiring service personnel physically move the carriage assembly 20. In at least one embodiment, the transport system 28 may be formed from a plurality of wheels 30 configured to be attached to a generally curved track 32. The wheels 30 may include a plurality of teeth 34 adapted to mesh with teeth 36 on the generally curved track 32. The transport system 28 may also include a drive motor 38 in communication with the wheels 30 to rotate the wheels 30 via shaft 39, as shown in FIG. 5, to move the carriage assembly 20 relative to a turbine vane attachment system 10. In at least one embodiment, the drive motor 38 may be configured to move the carriage assembly 20 at a rate of between about ½ inch per minute and about 30 inches per minute. The rate of movement of the carriage assembly 20 is dependent upon factors such as, but not limited to, the process being implemented by the material processing implements 26, the type of material being added to the worn section of the turbine vane attachment system 10, the amount of material being added to the worn section of the turbine vane attachment system 10, and other factors. The drive motor 38 may be any motor capable of moving the carriage assembly.

Figure 2:
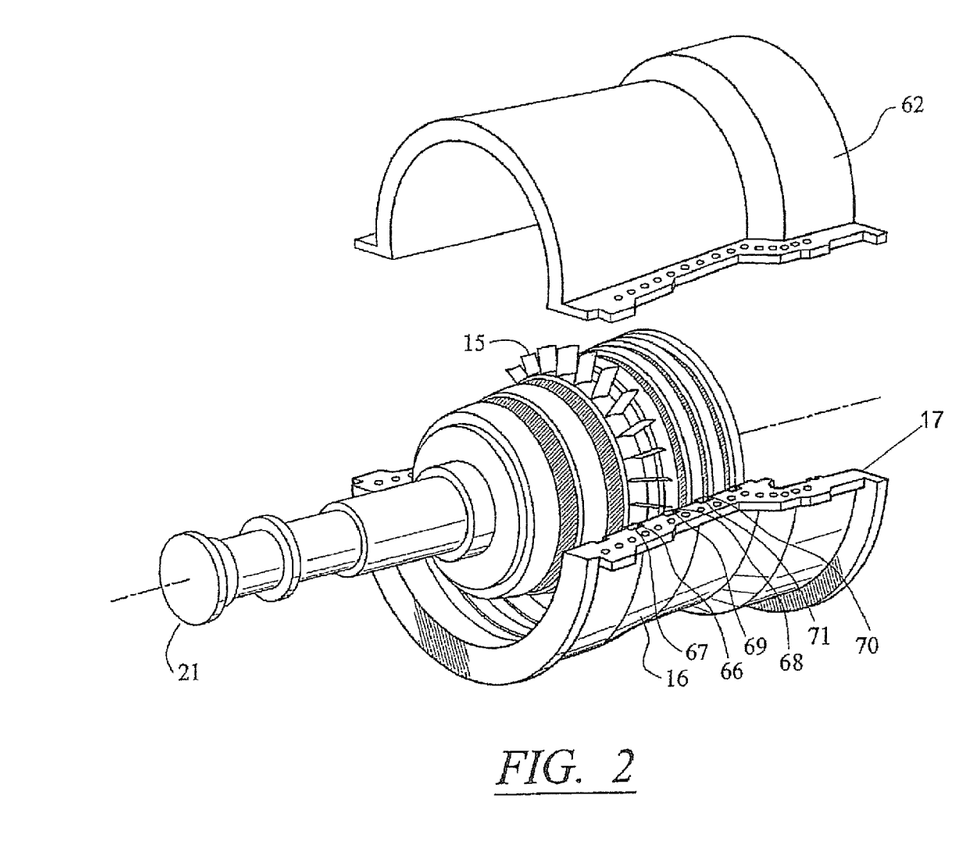
FIG. 2 is a partially exploded perspective view of a turbine engine.
Figure 3:
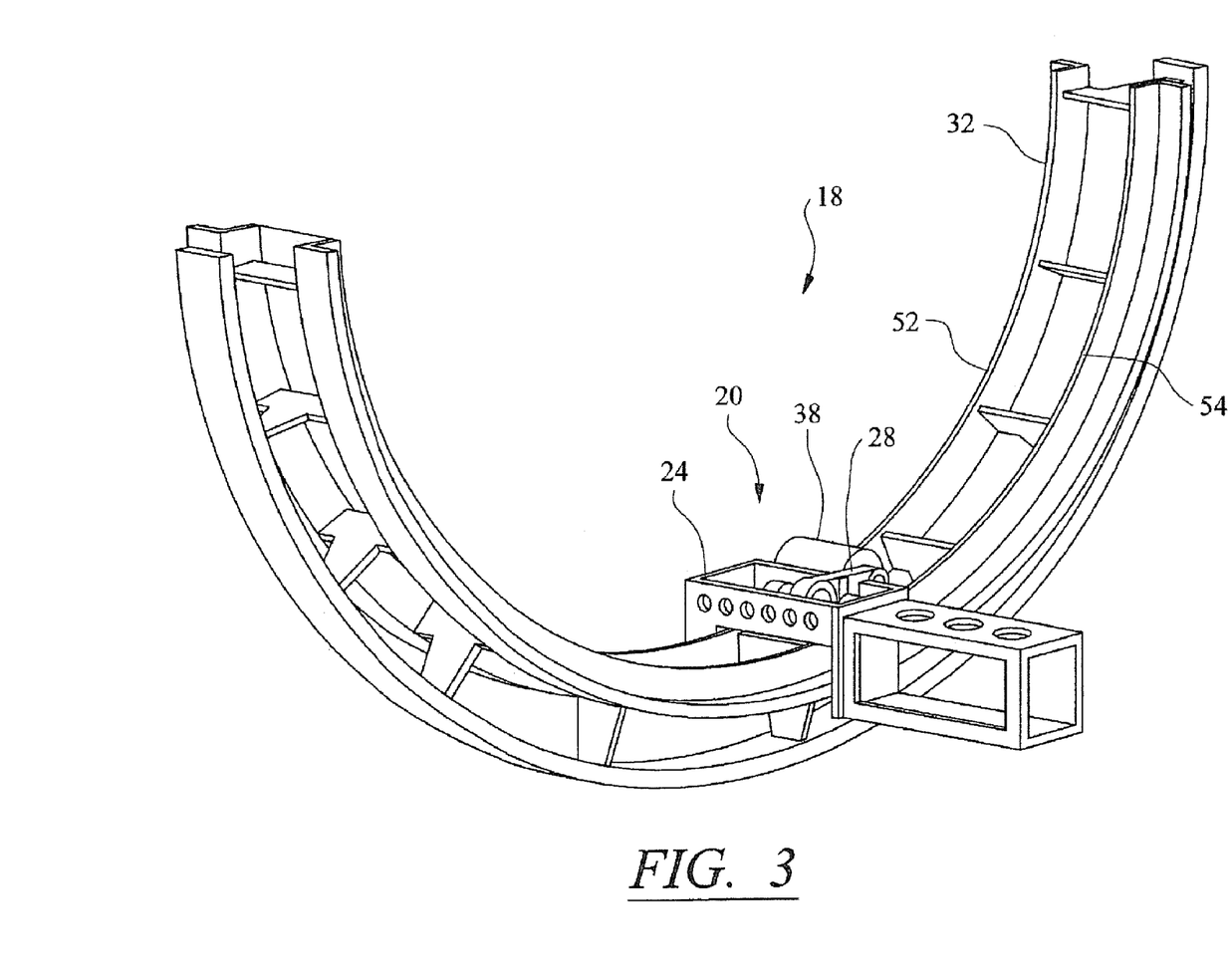
FIG. 3 is a perspective view of the restoration system of this invention.
Figure 4:
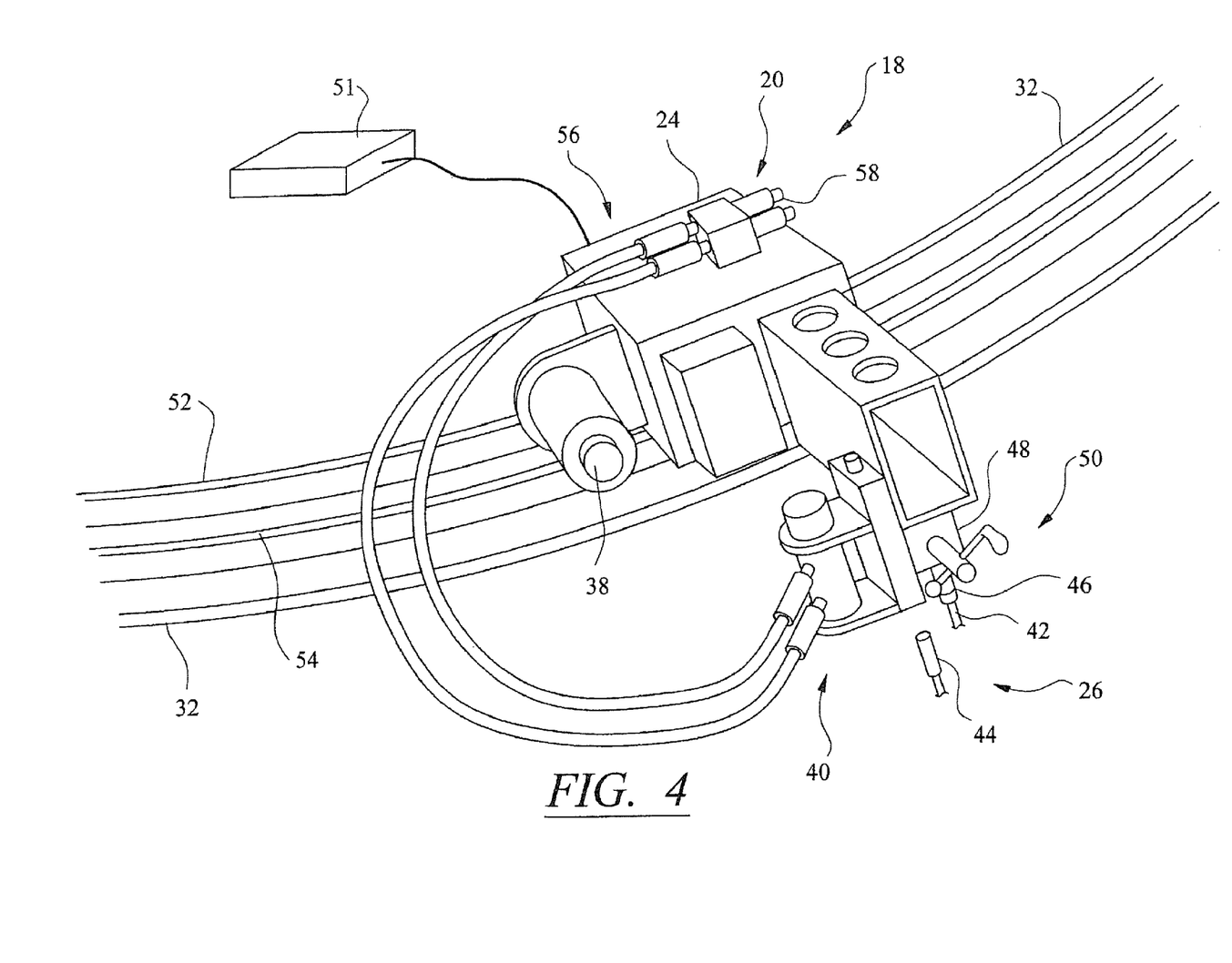
FIG. 4 is a perspective view of the carriage assembly coupled to a track.

The generally curved track 32 may be configured to support the carriage assembly 20 and to enable the carriage assembly 20 to be movably attached to the combustion turbine case 16. In at least one embodiment, as shown in FIG. 3, the generally curved track 32 may be configured to form a generally semicircular shape that follows a turbine vane attachment system 10. The track 32 may include sections that form a quarter circle and are capable of being coupled together to form a longer, continuous track. The generally curved track 32 may be configured to be attached to conventional combustion turbine cases 16 that are currently in use. The generally curved track 32 may be positioned in close proximity to a turbine vane attachment system 10. For instance, in at least one embodiment, the generally curved track 32 may be positioned over a turbine vane attachment system 10. In this position, the carriage assembly 20 may be used to work on adjacent turbine vane attachment systems 10 on either side of the turbine vane attachment system over which the carriage assembly is attached. The restoration system 18 may include curved tracks 32 having different radii of curvature that are sized to be coupled proximate to turbine vane attachment systems 10 having different radii of curvature. For example, in at least one embodiment as shown in FIG. 2, the restoration system 18 may include three generally curved tracks 32. A first track 66 may be configured to fit in close proximity to a row two turbine vane attachment system 67 and enable a carriage assembly 20 attached to the track 32 to contact and work on adjacent row one and row three turbine vane attachments systems 10. A second track 68 may be configured to fit in close proximity to a row three turbine vane attachment system 69 and enable a carriage assembly 20 attached to the track 32 to contact and work on adjacent row two and row four turbine vane attachments systems 10. A third track 70 may be configured to fit in close proximity to the row four turbine vane attachment system 71 and enable a carriage assembly 20 attached to the track 32 to contact and work on adjacent row three and row five turbine vane attachments systems 10. Thus, in this particular example, the tracks 32 enable the restoration system 18 to access and repair the turbine vane attachment systems 10 for all five rows of the turbine engine 22. The tracks 32 may be formed from materials, such as, but not limited to, metals such as SAE 1010-1020 steel, and other appropriate materials. In one embodiment, each track 32 may be formed from a first curved surface 52 and a second curved surface 54, as shown in FIGS. 4 and 5, to support the carriage assembly 20. The first and second curved surfaces 52, 54 may include teeth 36 configured to mesh with the teeth 34 on the wheels 30 on the carriage assembly 20.

As shown in FIG. 4, the carriage assembly 20 may include a component drive system 40 configured to drive the material processing implements 26. The material processing implements may include, but are not limited to, a milling cutter 42, such as, but not limited to, a dovetail cutter, a weld head 44, such as tungsten inert gas (TIG) weld head, and other appropriate devices. The component drive system 40 may include a spindle 46 in communication with a spindle drive device 48. The spindle 46 may be configured to receive material processing implements 26, such as the milling cutter 42. In at least one embodiment, the spindle 46 may be rotated at high speeds, such as between about 80 revolutions per minute (rpm) and about 600 rpm, to operate the milling cutter 42.

The carriage assembly 20 may include a position control system 50 for controlling the position of the material processing implements 26. The position control system 50 may be formed from a gear system, or other appropriate system, enabling the position control system 50 to move a material processing implement through three degrees of movement and rotate about 3 axes. The position control system 50 may include macro and micro adjustments enabling, large and small adjustments, respectively, to be made to the position of a material processing implement 26. For instance, the position control system 50 may enable a material processing implement 26, such as a milling cutter 42, to be advanced from the carriage assembly 20 and placed in contact with a diaphragm hook fit 12. The position control system 50 may be used to control the position of the milling cutter 42 throughout a material removal process or a welding head 44 during a material supplementation process.

The restoration system 18 may include an systems control device 51, which may be, but is not limited to being, a microcontroller, personal computer, or other programmable device for controlling operations. The systems control device 51 may be configured to control the transport system 28, component drive system 40, and the position control system 50.

The carriage assembly 20 may include one or more ancillary device support systems 56 for supporting devices capable of being used with the restoration system 18. In at least one embodiment, the ancillary device support system 56 may include one or more hydraulic hose connections 58, as shown in FIG. 4. The hydraulic hose connections 58 may be, but are not limited to, a conventional quick connect configuration. The hydraulic hose connection 58 may be used to support hydraulically driven devices, such as, but not limited to, a lamina power pack with quick disconnect couplings, which may be ¾ inches in nominal diameter.

Figure 1:
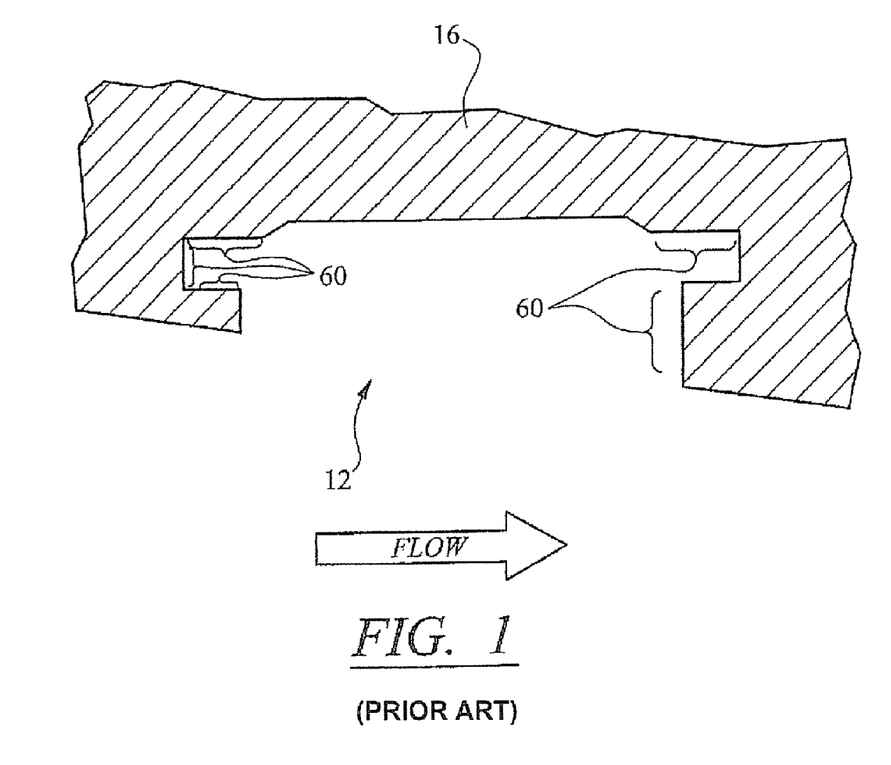
FIG. 1 is cross-section of a conventional turbine vane attachment system.

The restoration system 10 may be used to repair a turbine vane attachment system 10, such as a diaphragm hook fit 12. As shown in FIG. 1, a conventional diaphragm hook fit 12 may undergo wear in wear regions 60. Such wear may negatively effect performance of the turbine engine. However, the wear in the wear regions 50 may be restored using the restoration system 10. Access to a diaphragm hook fit 12 may first occur by removing a cover half 62 which may also be referred to as a first half, of the combustion turbine case 16. Once the cover half 62 has been removed, the turbine vanes 14 and turbine blades 15 may be removed using conventional procedures. Removal of the turbine vanes 14 provides sufficient room for the restoration system to be installed in the turbine engine without having to remove the rotor assembly 21 and without having to incur the costs associated with removal of the rotor assembly.

Figure 7:
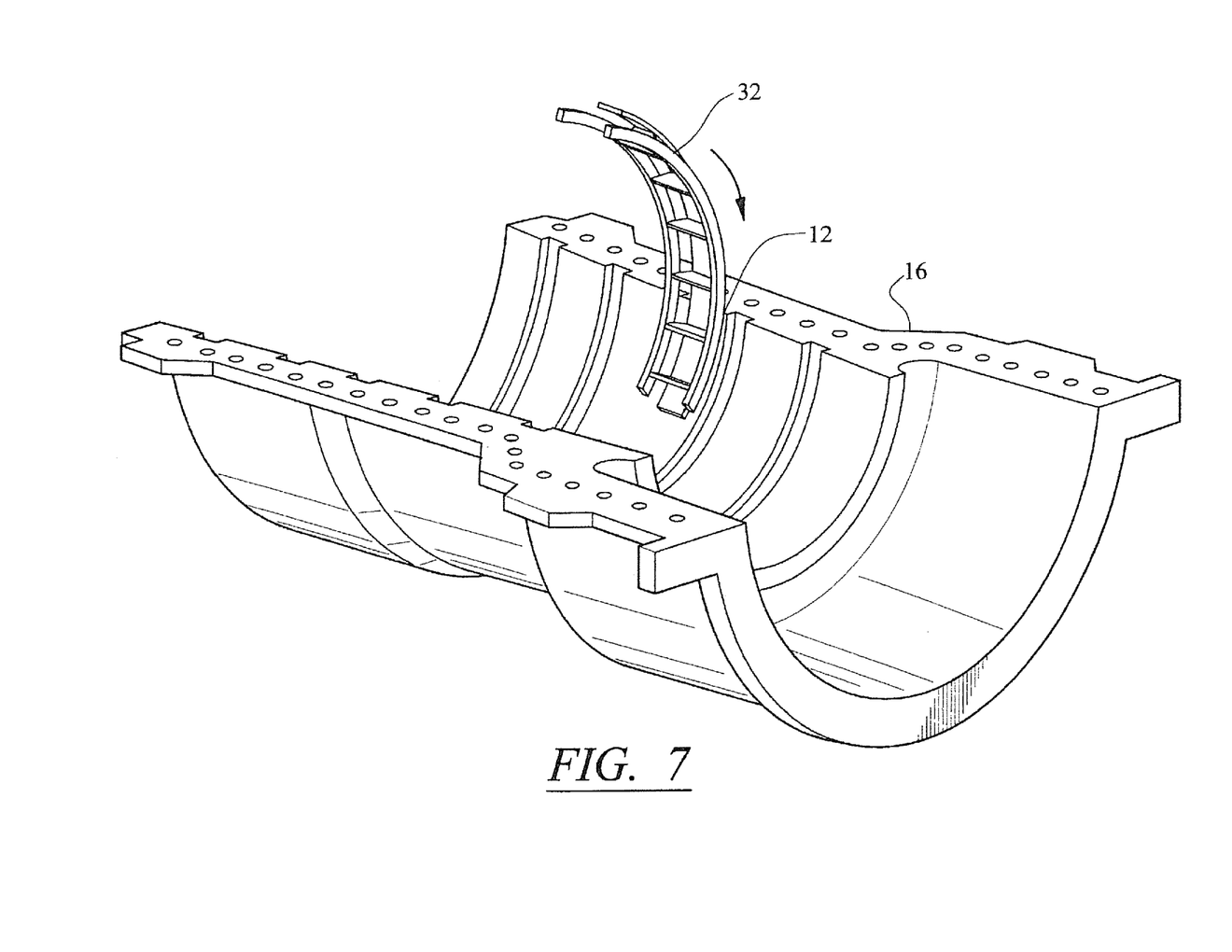
FIG. 7 is perspective view of a generally curved track of the restoration system being attached to a combustion turbine case.

A first generally curved track 32 may be attached to a second half 17 of the combustion turbine case 16 proximate to a diaphragm hook fit 12 corresponding to a second row of turbine vanes 14. A carriage assembly 20 may be movably coupled to the track 32 so that the carriage assembly 20 may travel along the length of the track 32. Movement of the carriage assembly 20 may be controlled by personnel, by a program on the systems control device 51, or with another appropriate device. The carriage assembly may be placed adjacent to a worn region 60. A milling cutter 42 may be extended to contact an adjacent worn region 60, if necessary, to prepare the worn region 60 for repair. The amount of material to be removed may be determined using conventional procedures. A welding head 44 may be placed in close proximity with the worn region 60 to add material to the worn region 60 to bring the worn region 60 within the specified tolerances of the diaphragm hook fit 12. The welding head 44 may be passed over a worn region 60 a sufficient number of times to build up the material to be within specified tolerances of the diaphragm hook fit 12. The carriage assembly 20 may be moved along the track 32 to facilitate building up material along a length of a worn region 60. Use of the carriage assembly 20 to add material along the length of a worn region 60 results in a tremendous time savings compared with conventional, manual repair methods.

Figure 8:
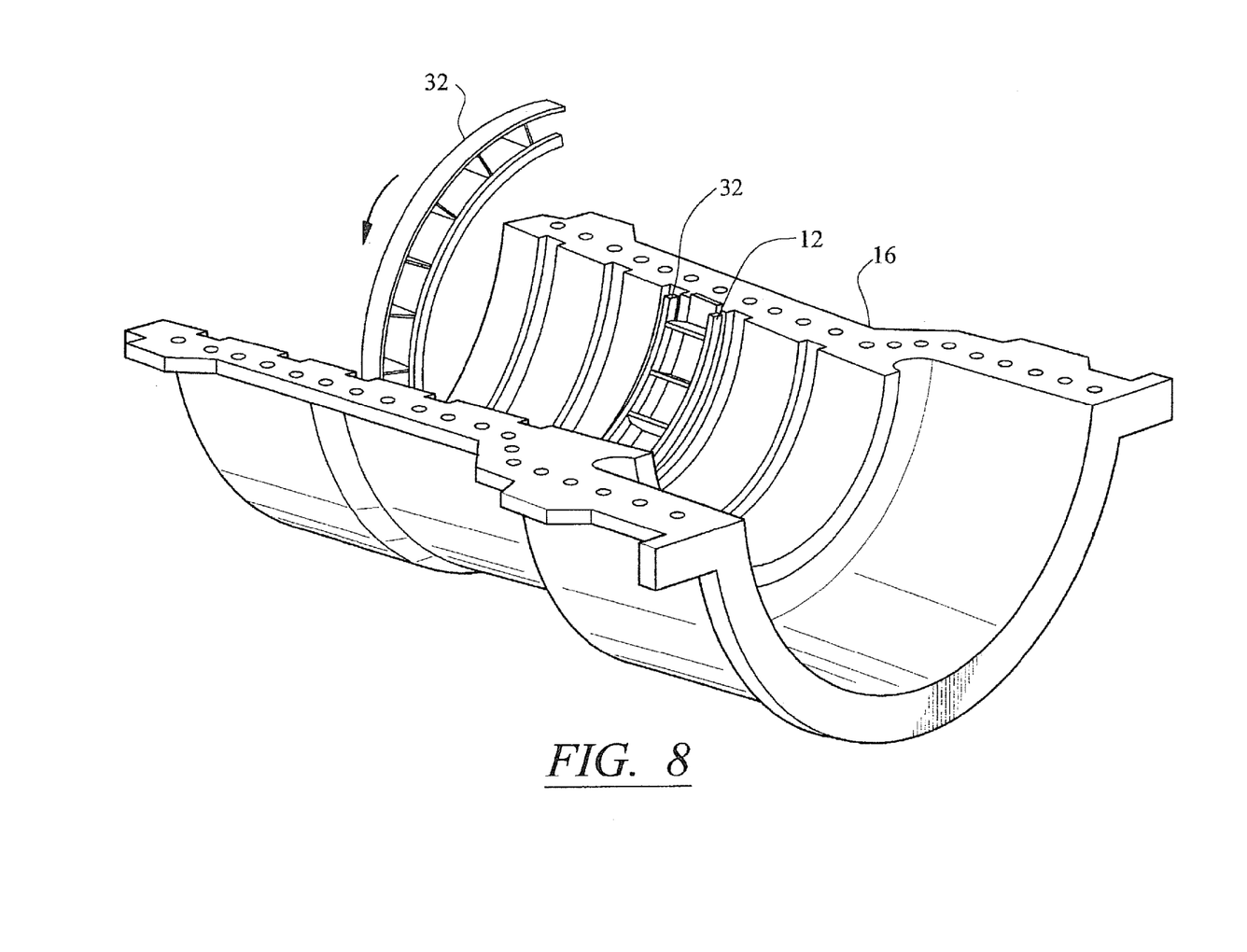
FIG. 8 is a perspective view of another section of generally curved track of the restoration system being attached to the combustion turbine case and to another section of the generally curved track.

After material has been added to the worn regions 60, the carriage assembly 20 may be moved along the track 32 adjacent to the worn region 60 on which material has been added. A milling cutter 42 may be placed into contact with the material added to the worn region 60 to remove excess material that was added. The milling cutter 42 may be rotated with the spindle 46 and spindle drive device 48. Once the material added to the worn regions 60 has been shaped to fit within the specified dimensional tolerances for the diaphragm hook fit 12, the material removal procedure may be ceased. The carriage assembly 20 may then be used to work on worn regions 60 on another adjacent diaphragm hook fit 12 using the same process. Once both diaphragm hook fits 12 adjacent to the track 32 have been repaired, the carriage assembly 20 and the track 32 may be removed. The process may be preformed on adjacent diaphragm hook fits 12 by attaching a corresponding curved track 32 to the combustion turbine case 16 proximate to another diaphragm hook fit 12, such as a row three turbine vane attachment system 10, so that row two and row three turbine vane attachment systems 10 may be restored.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A method of repairing a turbine vane attachment system, comprising:
    attaching a generally curved track to a combustion turbine case between the combustion turbine case and a rotor assembly without removing the rotor assembly;
    attaching at least one movable carriage assembly movably coupled to the generally curved track, wherein the at least one movable carriage assembly includes at least one component drive system comprising a spindle coupled to the movable carriage and adapted to receive material processing implements for restoring a hook fit of the turbine vane attachment system, a spindle drive device in communication with the at least one spindle that is configured to rotate the spindle, a milling cutter coupled to the spindle for removing material from a hook fit of the turbine vane attachment system, and a weld head attached to the at least one moveable carriage assembly;
    positioning the milling cutter in contact with a worn portion of a turbine vane attachment system;
    rotating the milling cutter to prepare the worn portion of the turbine vane attachment system for material addition;
    adding material to the worn portion of the turbine vane attachment system using the weld head;
    rotating the milling cutter to remove some of the material added to the turbine vane attachment system to place the turbine vane attachment system within designed tolerances.

2. The method of claim 1, further comprising removing a first half of the combustion turbine case to provide access to inner aspects of the combustion turbine case and removing stationary turbine vanes and rotatable turbine blades from the turbine combustion case so that the generally curved track is attachable to a second half of the combustion turbine case without removing the rotor assembly.

3. The method of claim 1, wherein attaching a generally curved track to a combustion turbine case comprises attaching the generally curved track over a turbine vane attachment system having adjacent turbine vane attachment systems thereby enabling the milling cutter to restore worn regions of the adjacent turbine vane attachment systems.

4. The method of claim 1, further comprising moving the at least one movable carriage assembly along the generally curved track while the milling cutter is in contact with an adjacent turbine vane attachment system.

5. The method of claim 4, wherein moving the at least one movable carriage assembly along the generally curved track comprises moving the carriage assembly at a rate of between about ½ inch per minute and about 30 inches per minute.

6. The method of claim 1, wherein attaching a generally curved track to a combustion turbine case comprises attaching a generally curved track formed from a plurality of curved tracks to the combustion turbine case.

7. The method of claim 6, wherein attaching a generally curved track formed from a plurality of curved tracks to a combustion turbine case comprises attaching a generally curved track formed from three curved tracks, comprising;
    a first curved track configured to be attached proximate to a row two turbine vane attachment system,
    a second track configured to be attached proximate to a row three turbine vane attachment system, and
    a third track configured to be attached proximate to a row four turbine vane attachment system.

8. The method of claim 1, wherein positioning the milling cutter in contact with a worn portion of a turbine vane attachment system comprises positioning the milling cutter with a transport system coupled to the carriage assembly for moving the carriage assembly relative to the generally curved track.

9. The method of claim 8, wherein positioning the milling cutter in contact with a worn portion of a turbine vane attachment system comprises positioning the milling cutter with a transport system formed from a drive motor, a shaft extending from the drive motor, and at least one wheel attached to the shaft.

10. The method of claim 9, wherein positioning the milling cutter in contact with a worn portion of a turbine vane attachment system comprises positioning the milling cutter with a generally curved track comprised of a plurality of teeth adapted to mesh with the at least one wheel of the transport system.

11. The method of claim 10, wherein positioning the milling cutter in contact with a worn portion of a turbine vane attachment system comprises positioning the milling cutter with a generally curved track comprised of first and second curved surfaces with a plurality of teeth adapted to mesh with drive gears of the transport system.

12. The method of claim 1, further comprising operating a position control system for controlling the position of the material processing implements.

13. The method of claim 1, wherein positioning the milling cutter in contact with a worn portion of a turbine vane attachment system comprises operating an ancillary device support system including a hydraulic drive assembly coupled to the carriage assembly for driving hydraulic tools.

14. A method of repairing a turbine vane attachment system, comprising:
    removing a first half of a combustion turbine case to provide access to inner aspects of the combustion turbine case and removing stationary turbine vanes and rotatable turbine blades from the combustion turbine case so that a generally curved track is attachable to a second half of the combustion turbine case without removing a rotor assembly;

attaching the generally curved track formed from a plurality of curved tracks to the second half of the combustion turbine case without removing the rotor assembly;

attaching at least one movable carriage assembly movably coupled to the generally curved track, wherein the at least one movable carriage assembly includes at least one component drive system comprising a spindle coupled to the movable carriage and adapted to receive material processing implements for restoring a hook fit of the turbine vane attachment system, a spindle drive device in communication with the at least one spindle that is configured to rotate the spindle, a milling cutter coupled to the spindle for removing material from a hook fit of the turbine vane attachment system, and a weld head attached to the at least one moveable carriage assembly;

positioning the milling cutter in contact with a worn portion of a turbine vane attachment system with a transport system formed from a drive motor, a shaft extending from the drive motor, and at least one wheel attached to the shaft;

rotating the milling cutter to prepare the worn portion of the turbine vane attachment system for material addition;

moving the at least one movable carriage assembly along the generally curved track while the milling cutter is in contact with an adjacent turbine vane attachment system;

adding material to the worn portion of the turbine vane attachment system using the weld head;

rotating the milling cutter to remove some of the material added to the turbine vane attachment system to place the turbine vane attachment system within designed tolerances.

15. The method of claim 14, wherein attaching a generally curved track to the second half of the combustion turbine case comprises attaching the generally curved track over a turbine vane attachment system having adjacent turbine vane attachment systems thereby enabling the milling cutter to restore worn regions of the adjacent turbine vane attachment systems.

16. The method of claim 14, wherein moving the at least one movable carriage assembly along the generally curved track comprises moving the carriage assembly at a rate of between about ½ inch per minute and about 30 inches per minute.

17. The method of claim 16, wherein attaching a generally curved track formed from a plurality of curved tracks to the second half of the combustion turbine case comprises attaching a generally curved track formed from three curved tracks,
    a first curved track configured to be attached proximate to a row two turbine vane attachment system,
    a second track configured to be attached proximate to a row three turbine vane attachment system, and
    a third track configured to be attached proximate to a row four turbine vane attachment system.

18. The method of claim 14, wherein positioning the milling cutter in contact with a worn portion of a turbine vane attachment system comprises positioning the milling cutter with a transport system coupled to the carriage assembly for moving the carriage assembly relative to the generally curved track.

19. The method of claim 14, further comprising operating a position control system for controlling the position of the material processing implements.

20. The method of claim 14, wherein positioning the milling cutter in contact with a worn portion of a turbine vane attachment system comprises operating an ancillary device support system including a hydraulic drive assembly coupled to the carriage assembly for driving hydraulic tools.

\* \* \* \* \*